US012795473B2

(12) United States Patent
Da Silva et al.

(10) Patent No.: US 12,795,473 B2
(45) Date of Patent: Nov. 10, 2026

(54) RACH-LESS LTM EXECUTION WHEN LTM CANDIDATE CELL IS A CURRENT SERVING CELL

(71) Applicant: TELEFONAKTIEBOLAGET LM ERICSSON (PUBL), Stockholm (SE)

(72) Inventors: Icaro Leonardo Da Silva, Stockholm (SE); Rida Khan, Stockholm (SE); Jens Bergqvist, Linköping (SE); Antonino Orsino, Jorvas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/252,580

(22) Filed: Jun. 27, 2025

(65) Prior Publication Data

US 2026/0006504 A1 Jan. 1, 2026

Related U.S. Application Data

(60) Provisional application No. 63/665,622, filed on Jun. 28, 2024.

(51) Int. Cl.

*H04W 4/00* (2018.01)
*H04W 36/00* (2009.01)
*H04W 36/04* (2009.01)
*H04W 56/00* (2009.01)

(52) U.S. Cl.

CPC . *H04W 36/00725* (2023.05); *H04W 36/0085* (2018.08); *H04W 36/04* (2013.01); *H04W 56/0015* (2013.01); *H04W 56/0045* (2013.01)

(58) Field of Classification Search

CPC ....... H04W 36/00725; H04W 36/0085; H04W 36/04; H04W 56/0015; H04W 56/0045

USPC ........................................................ 370/311

See application file for complete search history.

(56) References Cited

U.S. PATENT DOCUMENTS

| | | | | |
|---|---|---|---|---|
| 2023/0086614 A1* | 3/2023 | Kim | H04W 36/00838 370/331 |
| 2023/0388871 A1* | 11/2023 | Guo | H04W 36/0069 |
| 2024/0147315 A1* | 5/2024 | Park | H04W 36/0058 |
| 2024/0224137 A1* | 7/2024 | Chandrashekar | H04W 36/087 |
| 2024/0422590 A1* | 12/2024 | Kim | H04L 5/0098 |

OTHER PUBLICATIONS

"3rd Generation Partnership Project; Technical Specification Group Radio Access Network; NR; NR and NG-RAN Overall Description; Stage 2 (Release 18)", Technical Specification, 3GPP TS 38.300 V18.1.0 (Mar. 2024), 265 Pages.

Intel (Moderator), "New WID: NR mobility enhancements Phase 4", 3GPP TSG RAN Meeting #102, RP-234036, Dec. 11-15, 2023, 5 Pages, Edinburgh, Scotland.

* cited by examiner

*Primary Examiner* — Temica M Beamer

(74) *Attorney, Agent, or Firm* — Ericsson Inc.

(57) ABSTRACT

A radio access network node, a user equipment, UE, and a method of the UE are disclosed. The method which is performed by the UE comprises performing a Random Access Channel, RACH-less Layer 1/Layer 2 Triggered Mobility, LTM, execution procedure to an LTM candidate cell when the LTM candidate cell is also a current serving cell with which the UE is configured. The performing of the RACH-less LTM execution comprises sending a Scheduling Request, SR, over Physical Uplink Control Channel, PUCCH, on the LTM candidate cell.

21 Claims, 7 Drawing Sheets

RACH-LESS LTM EXECUTION WHEN LTM CANDIDATE CELL IS A CURRENT SERVING CELL

RELATED APPLICATION

The present application priority to U.S. Provisional Patent Application No. 63/665,622, filed Jun. 28, 2024, entitled "RACH-LESS LTM EXECUTION WHEN LTM CANDIDATE CELL IS A CURRENT CELL (UE IMPLEMENTATION)," the disclosure of which is hereby incorporated herein by reference in its entirety.

BACKGROUND

L1/L2 Triggered Mobility

Layer 1 (L1)/Layer 2 (L2) Triggered Mobility (LTM) is a procedure specified in 3rd Generation Partnership Project (3GPP) Release (Rel-) 18 (see, e.g., 3GPP Technical Specification (TS) 38.300 V.18.1.0) in which a gNodeB (gNB) receives L1 measurement report(s) from a User Equipment (UE), and on the basis of the received L1 measurement reports, the gNB changes the UE serving cell by a cell switch command signaled via a Medium Access Control (MAC) Control Element (CE). The cell switch command indicates an LTM candidate configuration that the gNB previously prepared and provided to the UE through Radio Resource Control (RRC) signaling. Then, the UE switches to the target configuration according to the cell switch command. FIG. 1 depicts the step-by-step procedure for LTM execution.

When configured by the network, it is possible to initiate the Uplink (UL) Timing Advance (TA) acquisition (called early TA acquisition) procedure of one or multiple LTM candidate cells that are different from the current serving cells of the UE. The early TA acquisition procedure is triggered by a Physical Downlink Control Channel (PDCCH) order or realized through UE-based TA measurement as configured by RRC. In the former case, the gNB/gNB-Distributed Unit (DU) to which the candidate cell belongs calculates the TA value and sends it to the gNB/gNB-DU to which the serving cell belongs via gNB-Central Unit (CU). The serving cell sends the TA value in the LTM cell switch command MAC CE when triggering LTM cell switch. In the latter case, the UE performs TA measurement for the candidate cells after being configured by RRC but the exact time the UE performs TA measurement is up to UE implementation. The UE applies the TA value measured by itself and performs Random Access Channel (RACH)-less LTM upon receiving the cell switch command. The network may also send a TA value in the LTM cell switch command MAC CE without early TA acquisition.

Depending on the availability of a valid TA value, the UE performs either a RACH-less LTM or RACH-based LTM cell switch. If the valid TA value is provided in the cell switch command, the UE applies the TA value as instructed by the network. In the case where UE-based TA measurement is configured, but no valid TA value is provided in the cell switch command, the UE applies the valid TA value by itself if available. Meanwhile, the UE performs RACH-less LTM cell switch upon receiving the cell switch command. If no valid TA value is available, the UE performs RACH-based LTM cell switch.

For RACH-less LTM, the UE accesses the target cell using either a configured grant or a dynamic grant. The configured grant is provided in the LTM candidate configuration, and the UE selects the configured grant occasion associated with the beam indicated in the cell switch command. Upon initiation of LTM cell switch to the target cell, the UE starts to monitor PDCCH on the target cell for dynamic scheduling.

Conditional LTM (CLTM)

Conditional handover (CHO) and other related conditional mobility procedures (e.g., Conditional Primary Secondary cell (PSCell) Change) were introduced in New Radio (NR) for improving the mobility robustness by preparing the UE (and the CHO candidate cells) in advance before there are any radio link outages. The UE is provided the RRC configuration of the candidate CHO cells, alike LTM, and some CHO execution conditions, which once fulfilled lead the UE to directly perform the handover without sending measurement report to the network, unlike LTM. However, there are other differences between the legacy CHO and LTM, for example, the CHO does not include the procedure of early synchronization in Rel-18.

To facilitate both the advantages of short mobility interruption time as well as better robustness, 3GPP Rel-19 aims at introducing Conditional LTM (CLTM) as part of the mobility-related enhancements. The following Conditional LTM-related objectives have been agreed upon in NR mobility enhancements phase 4 work item (WI) (see RP-234036, New WID: NR mobility enhancements Phase 4, 3GPP TSG RAN Meeting #102, Edinburgh, Scotland, Dec. 11-15, 2023):

Specify support of conditional LTM [RAN2, RAN3, RAN1]
- Specify UE evaluated conditions for triggering LTM.
- Aim to support conditional LTM including subsequent LTM.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
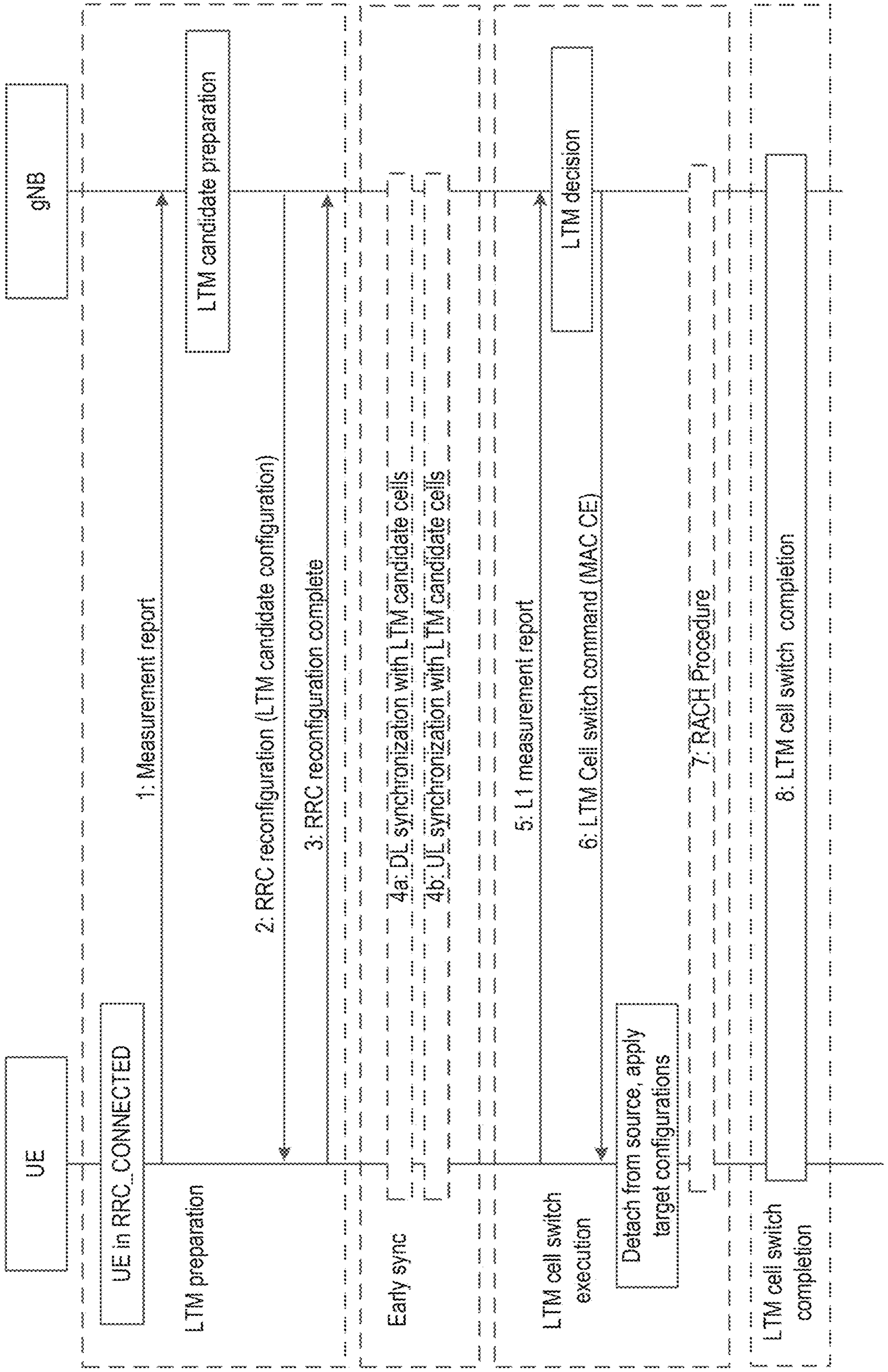
FIG. 1 illustrates an example procedure for LTM execution, according to some embodiments.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Embodiments are provided by way of example to convey the scope of the subject matter to those skilled in the art.

There currently exist certain challenge(s). According to 3GPP TS 38.300 V18.1.0, LTM supports both intra-frequency and inter-frequency mobility, including mobility to inter-frequency cell that is not a current serving cell. However, it may happen that the UE is configured with an LTM candidate cell which is a currently configured serving cell e.g. a secondary cell (SCell), and further receives an LTM Cell Switch command indicating an LTM candidate identifier for an LTM candidate cell which turns out to be a currently configured serving cell i.e. it is a cell to which the UE may be UL synchronized, even though the UE has not been triggered to perform a TA acquisition procedure and/or the UE has not been configured to perform UE-based TA measurement. No optimizations for that case were specified in 3GPP Rel-18.

As stated in 3GPP TS 38.300 V18.1.0, if the cell has the same TA value (denoted as $N_{TA}$) as the current serving cells or $N_{TA}=0$, early TA acquisition procedure is not required. When the UE receives the LTM Cell Switch command for a given cell group (e.g. Master Cell Group-MCG) while it is configured with a Secondary Cell (SCell) of that cell group, associated to the Source Distributed Unit (S-DU), and the indicated LTM candidate cell is that configured SCell, and TA acquisition has not been triggered and/or UE-estimation based TA is not configured, it is not clear how the UE would perform LTM Cell Switch.

In addition, there may be NR deployments in which SCell(s) are associated to a DU which is different from the S-DU which hosts the Special Cell (SpCell) in which the UE is operating i.e. it is not clear that the S-DU knows the TA value (also denoted $N_{TA}$) to be included in the LTM Cell Switch command when it needs to be triggered; hence, it would simply add an ‘FFF’ value which leads the UE to perform an a RACH-based LTM.

This becomes a bigger issue in Conditional LTM (CLTM), since the UE does not trigger the access to the target cell upon reception of an LTM Cell Switch command. As the work has not started, there are no mechanisms specified yet for the UE to receive a TA value, or for the UE to be indicated in the LTM Cell Switch command that the UE is to perform RACH (e.g., ‘FFF’ value). It may happen that a currently configured serving cell is configured as a CLTM candidate cell, and that is a cell for which CLTM execution condition is fulfilled and is selected by the UE for LTM execution.

Certain aspects of the disclosure and their embodiments may provide solutions to these or other challenges. Embodiments of a method performed at a User Equipment (UE) are disclosed in which the UE determines to perform a RACH-less LTM execution procedure (e.g. in response to an LTM Cell Switch command or in response to the fulfillment of an CLTM execution condition) to an LTM candidate cell when the LTM candidate cell is also a current serving cell (before the LTM execution) the UE is configured with. In other words, the target cell in the LTM procedure is one of the current serving cells in Master Cell Group (MCG) and/or Secondary Cell Group (SCG). Corresponding embodiments of a UE are also disclosed.

In other words, the UE determines that the CLTM candidate cell selected for performing CLTM execution is one of its configured serving cells i.e. a cell for which the UE knows how to sync in the UL (e.g. UE knows a TA value for it) or the UE is actually UL synchronized with, and is capable of transmitting in an UL channel requiring UL sync, such as Physical Uplink Control Channel (PUCCH) (e.g. in a case a Scheduling Request grant is configured) and/or Physical Uplink Shared Channel (PUSCH) (e.g. in case a pre-configured UL grant is available).

Some example embodiments of the present disclosure are as follows:

A1. A method at a User Equipment (UE) comprising performing a RACH-less LTM execution procedure to an LTM candidate cell when the LTM candidate cell is also a current serving cell with which the UE is configured.

A2. A method of A1, wherein performing RACH-less LTM execution is in response to the reception of an LTM Cell Switch command or in response to the fulfillment of an CLTM execution condition.

A3. A method of any of A1 to A2, wherein the current serving cell is configured at the UE before the LTM execution.

A4. A method of any of A1 to A3, wherein performing a RACH-less LTM execution is triggered by the reception of an LTM Cell Switch command, wherein the command comprises an indication that no valid timing adjustment and/or timing advance is available for the LTM candidate cell indicated in the LTM Cell Switch command.

A5. A method of ay of A1 to A4, wherein performing a RACH-less LTM execution is triggered by fulfillment of a CLTM execution condition associated to the LTM candidate cell.

A5a. A method of any of A1 to A4, wherein performing a RACH-less LTM execution is triggered by reception of an LTM Cell Switch command or in response to fulfillment of an CLTM execution condition and for the case when the UE is not configured to estimate the TA on its own.

A6. A method of any of A2, A5, or A5a, wherein the CLTM execution condition comprises one or more of the following:

LTM candidate cell becomes an offset better than the current Special cell (SpCell), e.g. Primary cell (PCell) or Primary Secondary cell (PSCell);

beam with highest measurement quantity of an LTM candidate cell becomes an offset better than the beam with highest measurement quantity of the current Special cell (SpCell), wherein the measurement quantity comprises an RSRP, RSRQ or SINR;

Synchronization Signal Block (SSB) with highest measurement quantity of an LTM candidate cell becomes an offset better than the SSB with highest measurement quantity of the current Special cell (SpCell), wherein the measurement quantity comprises an RSRP, RSRQ or SINR;

a lower layer measurement of an LTM candidate cell becomes an offset better than a lower layer measurement of the current Special cell (SpCell);

A7. A method of any of A1 to A6, wherein the LTM Cell Switch is triggered by the reception of an LTM Cell Switch from a Serving DU (S-DU) associated to an MCG or an SCG.

A8. A method of any of A1 to A7, wherein the LTM candidate cell, which is also a current serving cell, may correspond to any one or more of the following:

the LTM candidate cell, which is a current serving cell, is a Secondary Cell (SCell) of the same cell group in which the LTM execution procedure is being triggered.

the LTM candidate cell, which is a current serving cell, is a Secondary Cell (SCell) of different cell group in which the LTM execution procedure is being triggered.

the LTM candidate cell, which is a current serving cell, is a Special Cell (SpCell) of different cell group in which the LTM execution procedure is being triggered.

A9. A method of any of A1 to A8, further comprising performing a RACH-less LTM execution procedure to the LTM candidate cell when the serving cell with which the UE is configured when the RACH-less LTM procedure is triggered is a serving cell for which UL sync is considered valid.

A10. A method of any of A1 to A9, wherein the TA value of the LTM candidate cell which is a serving cell with which the UE is configured is considered valid when a time alignment timer, associated to the serving cell, is still running.

A10b. A method of any of A1 to A9, wherein the UE performs a RACH-less LTM execution procedure to the Candidate LTM cell when the Candidate LTM cell is a serving cell for which the UE is UL synch and/or for which the UE has obtained information on how to perform UL sync which was not part of the LTM configuration.

A11. A method of any of A1 to A10b, wherein, performing a RACH-less LTM execution procedure comprises one or more of the following steps:

sending Scheduling Request (SR) over Physical Uplink Control Channel (PUCCH) on the LTM candidate cell;

sending UL info (e.g. payload associated to an RRC Reconfiguration Complete message) using a pre-configured UL grant on the LTM candidate cell, associated to the LTM candidate cell configuration;

selecting a beam (and/or a reference signal) of the LTM candidate cell;

applying the LTM candidate cell configuration.

Certain embodiments may provide one or more of the following technical advantage(s). Embodiments of the present disclosure provide the possibility to perform a RACH-less LTM execution to an LTM candidate cell, even in case a TA acquisition procedure has not been triggered.

Embodiments of the present disclosure are applicable for LTM; thus, the description herein refers to the term "L1/L2 based inter-cell mobility (LTM)" as defined in 3GPP Release 18, though it interchangeably also uses the terms L1/L2 mobility, L1-mobility, L1 based mobility, L1/L2-centric inter-cell mobility, L1/L2 inter-cell mobility L1/L2-Triggered Mobility (LTM), Lower-layer triggered Mobility or simply LTM, as more widely used. The basic principle is that the UE receives a lower layer signaling from the network (e.g. a MAC Control Element-MAC CE) indicating to the UE a change (or switch or activation) of its PCell or PSCell, wherein a lower layer signaling is a message/signaling of a lower layer protocol, which may be referred as a L1/L2 inter-cell mobility execution command or LTM cell switch command. The change of PCell or PSCell may also lead to a change in SCell(s) for the same cell group, e.g. in case the command triggers the UE to change to another cell group configuration of the same type (e.g., another Master Cell Group (MCG) configuration). Before the UE receives the LTM cell switch command, the UE is configured by the network with one or more LTM candidate cell configurations (e.g., reception of an RRC Reconfiguration message, with at least one LTM candidate cell configuration). An LTM candidate cell configuration may include parameters in the Information Element (IE) CellGroupConfig per candidate cell and/or an embedded RRC Reconfiguration per LTM candidate cell.

The term "LTM cell switch procedure" or "LTM execution" refers to the process of a UE switching (or changing) its cell from a source cell to a target cell (which may be referred to herein an LTM candidate cell or a neighbor cell), using LTM. In the context of LTM, an LTM cell switch procedure may sometimes also be known as L1/L2 based inter-cell mobility execution, LTM execution, dynamic switch, LTM switch, (LTM) cell switch, (LTM) serving cell change or (LTM) cell change. In the context of the present disclosure, switching to the LTM candidate cell configuration comprises the UE considering that an LTM candidate cell becomes its new special cell (SpCell) e.g. PCell in case of LTM being configured for a Master Cell Group (MCG) and/or PSCell in case of LTM being configured for a Secondary Cell Group (SCG); or, changing its SpCell from the current PCell to an LTM candidate cell.

Even if the term "change of cell" is used, that may comprise a change of a whole cell group configuration, which includes a change in the SpCell (e.g., change of PCell or change of PSCell) and a change in SCells of the cell group (e.g., addition, modification, and/or release of one or more SCells).

An LTM cell switch procedure or LTM execution procedure may be triggered in the UE by reception of an LTM cell switch command (e.g., LTM Cell Switch Command), or alternatively, triggered in response to the detection of a failure (in case of fast recovery).

The description herein refers to a "LTM candidate cell," which is a cell the UE is configured with when configured with L1/L2-triggered mobility. That is a cell the UE can move to in a LTM cell switch procedure, upon reception of a LTM cell switch command. These cells may also be called candidate cell(s), candidates, mobility candidates, non-serving cells, additional cells, target candidate cell, target candidate, etc. According to the method, a configured LTM candidate cell may be a currently configured serving cell, i.e., an SCell from MCG or an SCell from SCG or PSCell.

An LTM candidate cell is a cell the UE may be configured to perform measurements on (e.g., Channel State Information (CSI) measurements) so that the UE reports these measurements and network may take educated decision on which beam (e.g., Transmission Configuration Indicator (TCI) state) and/or cell the UE is to be switched to. An LTM candidate cell may be a candidate to be a target PCell or PSCell, or an SCell of a cell group (e.g., MCG SCell or Secondary Cell Group (SCG) SCell) or PSCell. In the case of an LTM fast recovery, when a failure is detected, the UE selects a cell and when the cell is an LTM candidate cell the UE does not have to perform re-establishment, but instead performs an LTM cell switch towards the selected LTM candidate cell e.g. by applying the LTM candidate cell configuration associated to the selected LTM candidate cell.

The term "beam" may correspond to a spatial direction in which a signal is transmitted (e.g., by a network node) or received (e.g., by the UE), or a spatial filter applied to a signal which is transmitted or received. Thus, transmitting signals' different beams could correspond to transmitting signals in different spatial directions. When the text refers to a "beam which is selected" it may refer to a beam index and/or a Reference Signal (RS) index or identifier, such as a Synchronization Signal block (SSB) index, or a CSI Reference Signal (CSI-RS) resource identifier. Thus, selecting a beam may correspond to selecting an SSB, associated with an SSB index. Or, selecting a beam may correspond to selecting a CSI-RS, associated to a CSI-RS resource identifier.

In addition, embodiments of the present disclosure are also applicable for Conditional LTM (CLTM), which may be viewed as a form of conditional reconfiguration. In CLTM, the UE is configured with an LTM candidate cell (denoted a CLTM candidate cell), by receiving an LTM candidate cell configuration, as in legacy LTM, and called herein a Conditional LTM candidate cell configuration, and an associated execution condition, denoted CLTM execution condition. The CLTM execution condition associated to a CLTM candidate cell is associated to the assessment of lower layer measurements, such as Layer 1 (L1) Reference Signal Received Power (RSRP) and/or Synchronization Signal RSRP (SS-RSRP), derived from SSBs and/or CSI-RSs of either the serving cell and/or an CLTM candidate cell. Lower layer measurements, in this context, are measurements reported to support lower layer procedures like beam management, TCI state activations/deactivations, early timing advance (TA) acquisition, and link adaptation, and they aren't filtered based on Layer 3 (L3) parameters.

When configured with CLTM, the UE evaluates the CLTM execution condition (referred to as Conditional LTM execution condition, LTM execution condition, or triggering condition) or a combination thereof. And, when the condition for a CLTM candidate cell is fulfilled, the UE performs a CLTM execution, which may be seen as a kind of LTM execution (but not triggered by the reception of an LTM Cell Switch command); this may also be considered as a kind of LTM Cell Switch, or Conditional LTM cell switch. During the execution, the UE may apply a message, parts of a message, or at least one information element (IE), or perform a serving cell switch or change. According to the methods outlined in the present disclosure, upon satisfaction of the execution condition(s), the UE initiates an LTM Cell Switch.

The text also mentions an LTM candidate cell within the framework of Conditional LTM. The candidate cell may be referred to as a Conditional LTM candidate cell, simply candidate cell, candidate target cell, simply target cell, LTM candidate cell, or L1/L2 inter-cell mobility candidate cell, depending on the context or terminology used in the present disclosure. Essentially, it denotes a cell to which the UE is directed or switches in the event of executing a conditional L1/L2 inter-cell mobility procedure after meeting the associated execution condition(s). These cells may also be termed as candidate cells, mobility candidates, non-serving cells, additional cells, or deactivated cells (NOTE: this does not preclude a current serving cell being configured as a candidate cell, but in the context of the LTM procedures they would typically not be called serving cells). An LTM candidate cell might also pertain to a candidate cell in a 5G Radio Access Technology like NR or a future 6G Radio Access Technology.

The text refers to a RACH-less LTM execution procedure, which may be an LTM execution (for LTM or CLTM) in which the UE does not transmit a Physical Random Access Channel (PRACH) preamble to the LTM candidate cell as its first UL message. Instead, the UE either i) transmits a Scheduling Request (SR) over the Physical Uplink Control Channel (PUCCH), or any other UL control channel which requires the UE to be UL synchronized (or UL time aligned); or ii) transmits UL payload (bits associated to a complete message, e.g., RRC Reconfiguration Complete), e.g., using at least a pre-configured grant, over a Physical Uplink Shared Channel (PUSCH).

A Timing Advance Group (TAG) is defined as a group of Serving Cells for a UE that is configured by RRC and that, for the cells with an Uplink (UL) configured, using the same timing reference cell and the same Timing Advance (TA) value. In other words, cells within the same TAG share the same TA value. TAG configuration is done per cell group, which means that serving cells can share the same TAG if they belong to the same cell group (MCG or SCG). Wherein the TAG-Id indicates the TAG identity of the serving cell within the scope of a cell group (i.e., MCG or SCG). A Timing Advance Group containing the SpCell of a MAC entity is referred to as Primary Timing Advance Group (PTAG), whereas the term Secondary Timing Advance Group (STAG) refers to other TAGs [1]. Notice that there may also be multiple TA values for a given serving cell, e.g. in the case of MIMO operation and/or multi-TRP operation, wherein there may be a TA for a first set of TRPs and another TA for another set of TRPs, associated to the same serving cell.

In legacy operation, the UE keeps a time alignment timer associated to a TAG. While the timer alignment timer is running, the UE considers the UL sync as valid.

Embodiments of a method performed by a User Equipment (UE) are disclosed in which the UE performs a RACH-less LTM execution procedure (e.g. in response to an LTM Cell Switch command or in response to the fulfillment of an CLTM execution condition) to an LTM candidate cell when the LTM candidate cell is also a current serving cell (before the LTM execution) with which the UE is configured. In other words, the target cell in the LTM procedure is one of the current serving cells of the UE.

The method includes one or more options for the RACH-less execution:

- In one option, the RACH-less LTM execution procedure is triggered by the reception of an LTM Cell Switch command, including an indication that no valid timing adjustment is available for the LTM candidate cell indicated in the LTM Cell Switch command.
- In another option, the RACH-less LTM execution procedure is triggered by the fulfilling of a CLTM execution condition associated to the LTM candidate cell, such as the LTM candidate cell becomes an offset better than the current Special cell (SpCell), e.g. Primary cell (PCell).

Figure 2:
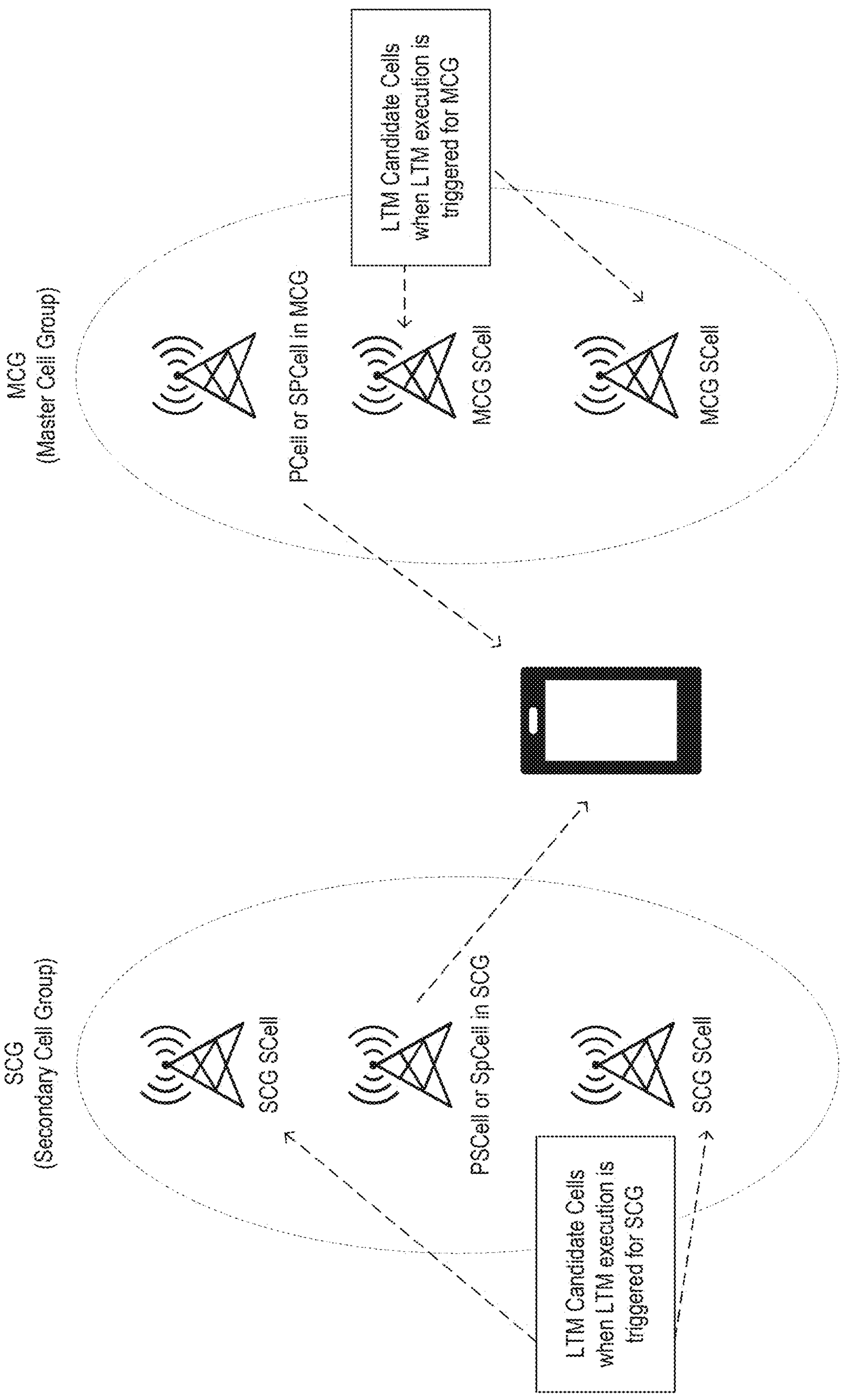
FIG. 2 illustrates an example serving cell that is an SCell of the same cell group in which a RACH-less LTM execution procedure is being triggered, according to some embodiments.

An LTM Cell Switch may either be triggered by a Serving DU (S-DU) associated to an MCG or an SCG, or by the fulfillment of CLTM execution conditions associated to the CLTM candidate cell belonging to the MCG or SCG. The method includes one or more options for the current serving cell with which the UE is configured when the LTM execution is triggered:

- In one option, the current serving cell to which the UE performs RACH-less LTM execution is a Secondary Cell (SCell) of the same cell group in which the LTM execution procedure is being triggered, as illustrated in FIG. 2.

In one sub-option, the LTM execution is triggered for the Master Cell Group (MCG), and the LTM candidate cell for which the procedure is triggered is an MCG SCell. For example, the UE receives an LTM Cell Switch command from the S-DU associated with the MCG.

In one sub-option, the LTM execution is triggered for the Secondary Cell Group (SCG), and the LTM candidate cell for which the procedure is triggered is an SCG SCell.

In one sub-option, the serving cell the UE is configured with, and that is the LTM candidate cell for the LTM execution, is associated with the same S-DU from which the UE receives the LTM Cell Switch command e.g. when the LTM candidate cell is an MCG SCell and the LTM is triggered for the MCG, or when the LTM candidate cell is an SCG SCell and the LTM is triggered for the SCG.

In one sub-option, the serving cell the UE is configured with, and that is the LTM candidate cell for the LTM execution, is associated with the same primary TAG of the serving cell (source cell) of MCG (both serving cell and LTM candidate cell have the same primary TAG on the MCG).

In one sub-option, the serving cell the UE is configured with, and that is the LTM candidate cell for the LTM execution, is associated with the same secondary TAG of the serving cell (source cell) of MCG (both source cell and LTM candidate cell have the same secondary TAG on the MCG).

In one sub-option the serving cell the UE is configured with, and that is the LTM candidate cell for the LTM execution, is associated with the same primary TAG of the serving cell (source cell) of SCG (both source cell and LTM candidate cell have the same primary TAG on the SCG).

In one sub-option, the serving cell the UE is configured with, and that is the LTM candidate cell for the LTM execution, is associated with the same secondary TAG of the serving cell (source cell) of SCG (both source cell and LTM candidate cell have the same secondary TAG on the SCG).

Figure 3:
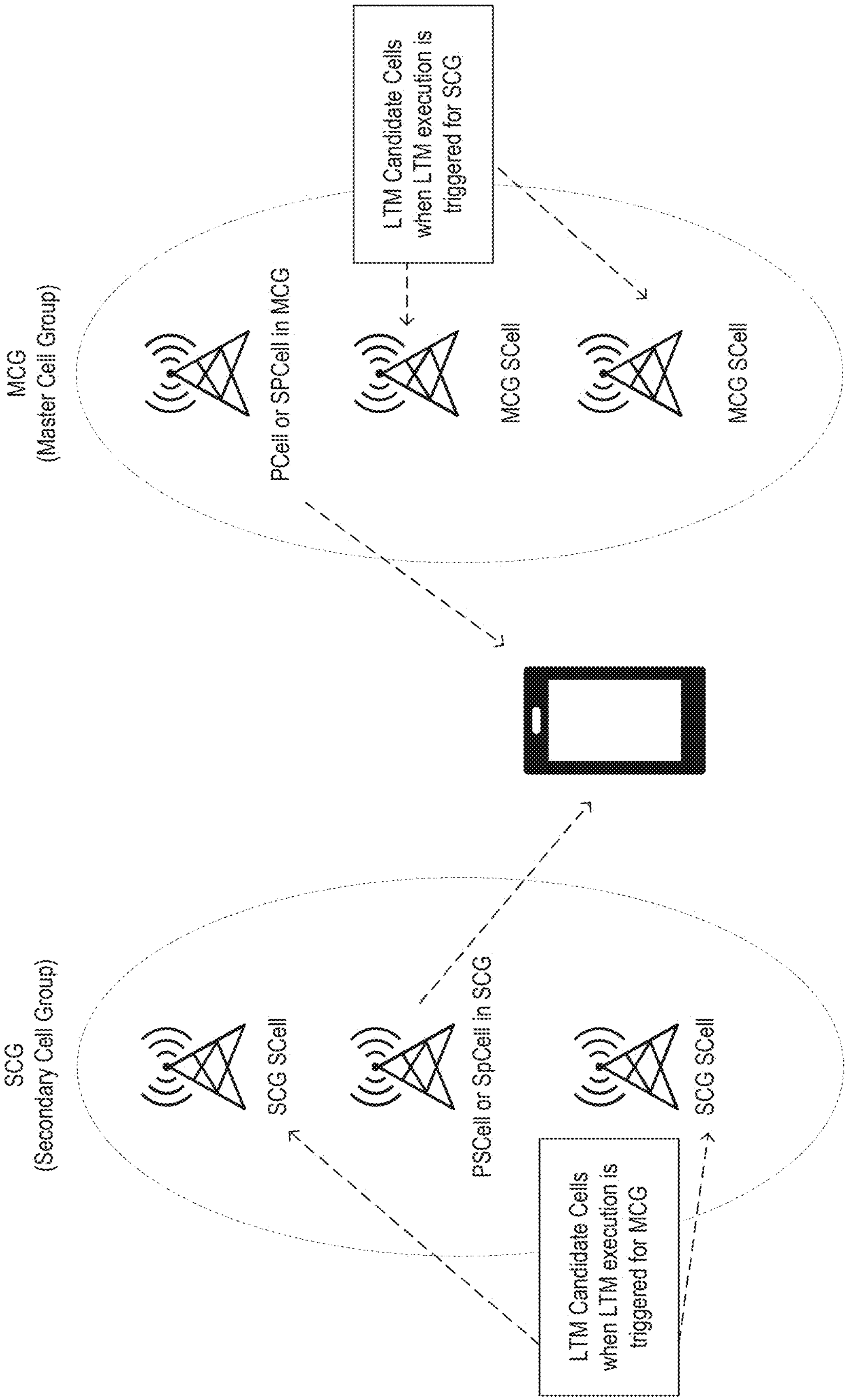
FIG. 3 illustrates an example serving cell that is an SCell of a different cell group in which a RACH-less LTM execution procedure is being triggered, according to some embodiments.

In another option, the current serving cell is a Secondary Cell (SCell) of different cell group in which the LTM execution procedure is being triggered, as shown in FIG. 3.

For example, when the LTM execution is triggered for the MCG, and the LTM candidate cell for which the procedure is triggered is a SCG SCell.

Associated to the same S-DU in which is transmitting the LTM CS command, or to a different one.

In one sub-option, the source cell and the LTM candidate cell are both synchronized to each other.

In one sub-option, the source cell and the LTM candidate cell are both overlapping in coverage, even if operating on different band/frequencies.

In one sub-option, the source cell and the LTM candidate cell are both overlapping in coverage and operate on the same band/frequencies.

In one option, the current serving cell is a Special Cell (SpCell) of different cell group in which the LTM execution procedure is being triggered.

For example, when the LTM execution is triggered for the MCG, and the LTM candidate cell for which the procedure is triggered is the Primary SCG Cell (PSCell).

In one sub-option, the LTM execution is triggered for the MCG, and the LTM candidate cell for which the procedure is triggered is the PSCell (SpCell of the SCG).

In one sub-option, the serving cell the UE is configured with, and that is the LTM candidate cell for the LTM execution, is associated with a different DU (which is not the S-DU from which the UE receives the LTM CS command) e.g. when the LTM candidate cell is an SCG SCell or a PSCell and the LTM is triggered for the MCG, or when the LTM candidate cell is an MCG SCell or the PCell, and the LTM is triggered for the SCG.

In one option, the UE performs RACH-less LTM execution to the LTM candidate cell when the serving cell (e.g. SCell of the MCG, PSCell, or SCell of the SCG) with which the UE is configured when the RACH-less LTM procedure is triggered is a serving cell for which the UL sync is considered valid e.g. has a TA value available which is valid.

In one sub-option, the TA value is considered valid when the time alignment timer, associated to the serving cell, is running when the UE needs to perform the RACH-less LTM execution procedure.

In one sub-option, the serving cell (indicated as the LTM candidate cell) is an SCell of the MCG and is associated to a Primary Time Alignment Group (PTAG), and the UL sync is considered valid when the time alignment timer for that PTAG is running.

In one sub-option, the serving cell (indicated as the LTM candidate cell) is an SCell of the SCG and is associated to a Secondary Time Alignment Group (STAG), and the UL sync is considered valid when the time alignment timer for that STAG is running.

Performing RACH-less LTM execution comprises one or more of the following steps:

sending Scheduling Request (SR) over Physical Uplink Control Channel (PUCCH) on the LTM candidate cell;

sending UL info (e.g., payload associated to an RRC Reconfiguration Complete message) using a pre-configured UL grant on the LTM candidate cell, associated to the LTM candidate cell configuration;

selecting a beam (and/or a reference signal) of the LTM candidate cell;

applying the LTM candidate cell configuration.

In one option, the UE determines to perform RACH-less LTM execution to an LTM candidate cell which is also a configured serving cell, using a TA value (e.g., $N_{TA}$) associated to a TAG of that serving cell, when the time alignment timer for that TAG is running.

Figure 4:
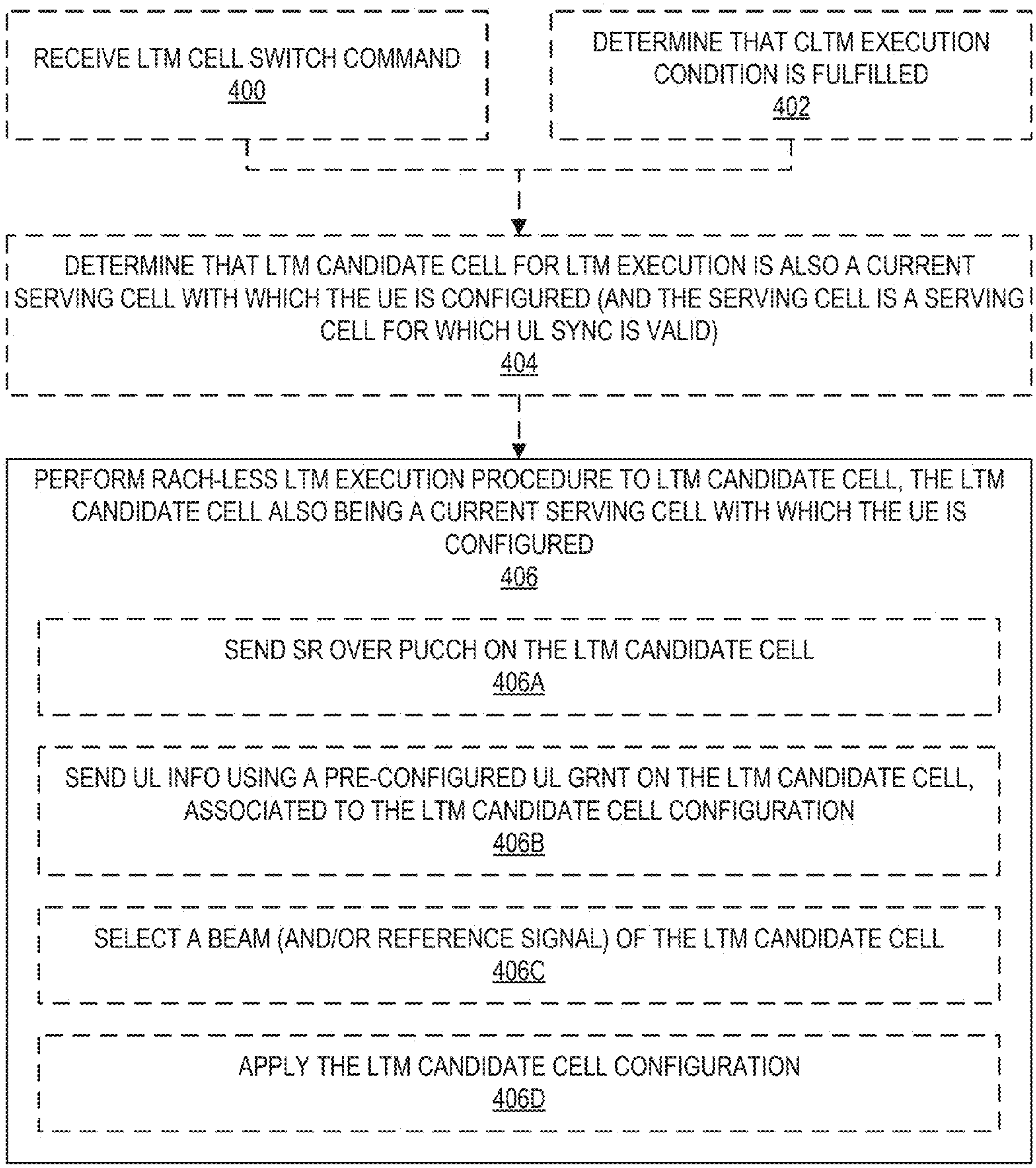
FIG. 4 is a flow chart that illustrates an example method performed by a UE, according to some embodiments.

FIG. 4 is a flow chart that illustrates a method performed by a UE in accordance with at least some of the embodiments described above. Optional steps are represented by dashed lines/boxes. Note that not all details from the description above may be repeated here in the description of the process of FIG. 4; however, such details provided above are to be understood as being directly applicable to the corresponding steps of FIG. 4. The process of FIG. 4 includes the following steps:

Step 400 (Optional): The UE receives an LTM cell switch command, e.g., from a network node (e.g., from a serving network node such as, e.g., a serving gNB or serving gNB-DU).

Step 402 (Optional): As an alternative to step 400, the UE determines that a CLTM execution condition is fulfilled. This may be done based on one or more CLTM configurations previously received by the UE, e.g., from a network node (e.g., a serving network node or serving DU).

Step 404 (Optional): The UE determines that a LTM candidate cell for LTM execution is also a current serving cell with which the UE is configured. The LTM candidate cell may be indicated in an LTM cell switch command (of step 400) or associated to an CLTM execution condition (of step 402). The UE determines that this LTM candidate cell is a serving cell with which the UE is configured and optionally that the UE is UL synchronized to this serving cell (e.g., that the TA for the serving cell is valid).

Step 406: The UE performs RACH-less LTM execution to the LTM candidate cell when the LTM candidate cell is also a serving cell with which the UE is configured (and optionally is a serving cell for which UL sync is valid). In other words, in one embodiment, the UE performs RACH-less LTM execution to the LTM candidate cell responsive to the LTM candidate cell also being a serving cell with which the UE is configured (and optionally also being a serving cell for which UL sync is valid), e.g., as determined in step 404. As discussed in detail above, step 406 (and optional step 404) may be triggered by reception of an LTM cell switch command (e.g., in step 400) or by fulfillment of a CLTM execution condition (e.g., in step 402). Further details regarding the triggering of the RACH-less LTM execution are provided above and are equally applicable here. As also described above, performing the RACH-less LTM execution to the LTM candidate cell may include any one or more of the following:

- sending Scheduling Request (SR) over Physical Uplink Control Channel (PUCCH) on the LTM candidate cell (step 406A);
- sending UL info (e.g., payload associated to an RRC Reconfiguration Complete message) using a pre-configured UL grant on the LTM candidate cell, associated to the LTM candidate cell configuration (step 406B);
- selecting a beam (and/or a reference signal) of the LTM candidate cell (step 406C);
- applying the LTM candidate cell configuration (step 406D).

Figure 5:
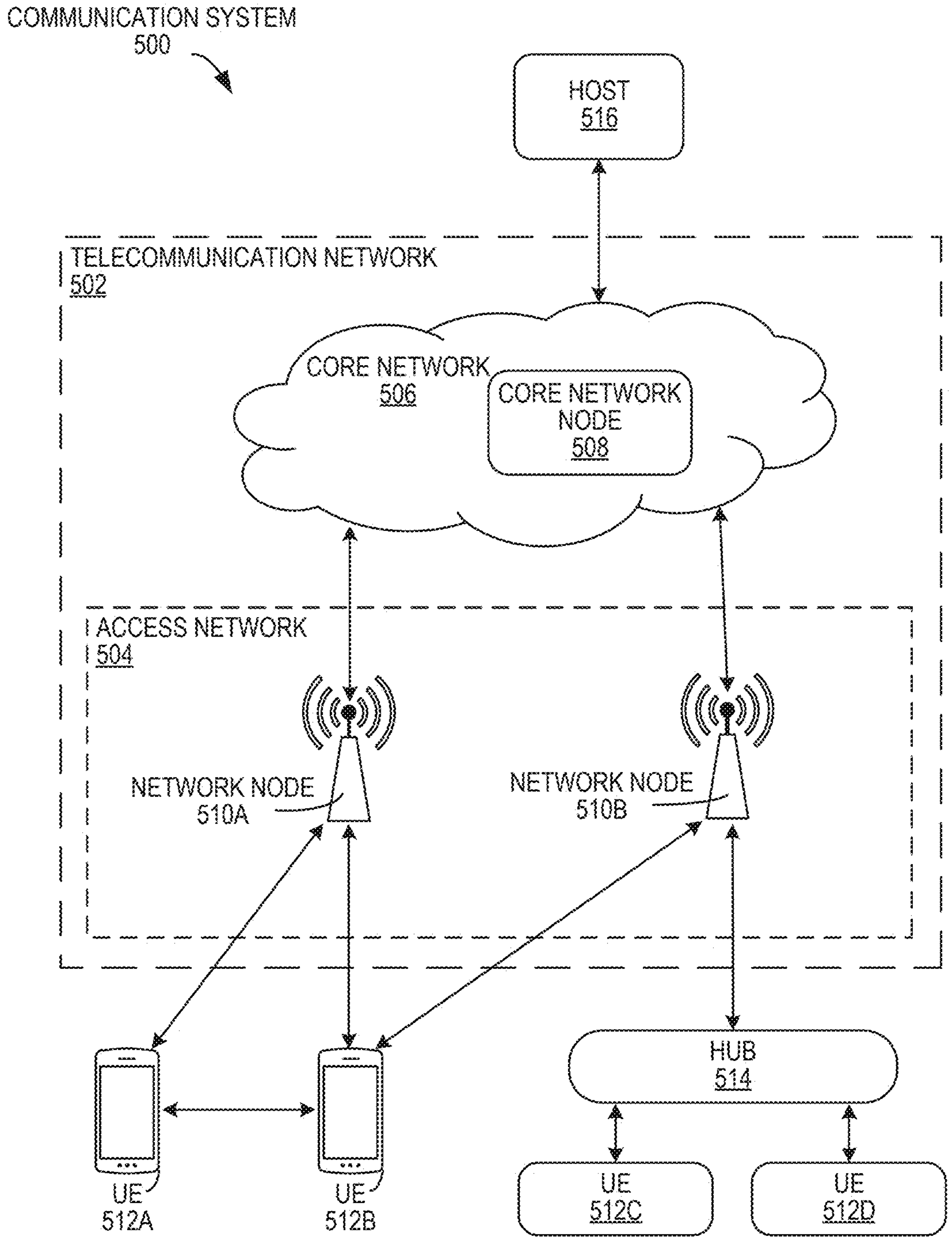
FIG. 5 illustrates a schematic diagram of an example communication system, according to some embodiments.

FIG. 5 shows an example of a communication system 500 in accordance with some embodiments.

In the example, the communication system 500 includes a telecommunication network 502 that includes an access network 504, such as a Radio Access Network (RAN), and a core network 506, which includes one or more core network nodes 508. The access network 504 includes one or more access network nodes, such as network nodes 510A and 510B (one or more of which may be generally referred to as network nodes 510), or any other similar Third Generation Partnership Project (3GPP) access nodes or non-3GPP Access Points (APs). Moreover, as will be appreciated by those of skill in the art, a network node is not necessarily limited to an implementation in which a radio portion and a baseband portion are supplied and integrated by a single vendor. Thus, it will be understood that network nodes include disaggregated implementations or portions thereof. For example, in some embodiments, the telecommunication network 502 includes one or more Open-RAN (ORAN) network nodes. An ORAN network node is a node in the telecommunication network 502 that supports an ORAN specification (e.g., a specification published by the O-RAN Alliance, or any similar organization) and may operate alone or together with other nodes to implement one or more functionalities of any node in the telecommunication network 502, including one or more network nodes 510 and/or core network nodes 508.

Examples of an ORAN network node include an Open Radio Unit (O-RU), an Open Distributed Unit (O-DU), an Open Central Unit (O-CU), including an O-CU Control Plane (O-CU-CP) or an O-CU User Plane (O-CU-UP), a RAN intelligent controller (near-real time or non-real time) hosting software or software plug-ins, such as a near-real time control application (e.g., xApp) or a non-real time control application (e.g., rApp), or any combination thereof (the adjective "open" designating support of an ORAN specification). The network node may support a specification by, for example, supporting an interface defined by the ORAN specification, such as an A1, F1, W1, E1, E2, X2, Xn interface, an open fronthaul user plane interface, or an open fronthaul management plane interface. Moreover, an ORAN access node may be a logical node in a physical node. Furthermore, an ORAN network node may be implemented in a virtualization environment (described further below) in which one or more network functions are virtualized. For example, the virtualization environment may include an O-Cloud computing platform orchestrated by a Service Management and Orchestration Framework via an O-2 interface defined by the O-RAN Alliance or comparable technologies. The network nodes 510 facilitate direct or indirect connection of User Equipment (UE), such as by connecting UEs 512A, 512B, 512C, and 512D (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508.

Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-Concealing Function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UEs, network nodes, and hosts. In that sense, the communication system 500 may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable Second, Third, Fourth, or Fifth Generation (2G, 3G, 4G, or 5G) standards, or any applicable future generation standard (e.g., Sixth Generation (6G)); Wireless Local Area Network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any Low Power Wide Area Network (LPWAN) standards such as LoRa and Sigfox.

In some examples, the telecommunication network 502 is a cellular network that implements 3GPP standardized features. Accordingly, the telecommunication network 502 may support network slicing to provide different logical networks to different devices that are connected to the telecommunication network 502. For example, the telecommunication network 502 may provide Ultra Reliable Low Latency Communication (URLLC) services to some UEs, while providing enhanced Mobile Broadband (eMBB) services to other UEs, and/or massive Machine Type Communication (mMTC)/massive Internet of Things (IoT) services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-Radio Access Technology (RAT) or multi-standard mode. For example, a UE may operate with any one or combination of WiFi, New Radio (NR), and LTE, i.e. being configured for Multi-Radio Dual Connectivity (MR-DC), such as Evolved UMTS Terrestrial RAN (E-UTRAN) NR-Dual Connectivity (EN-DC).

In the example, a hub 514 communicates with the access network 504 to facilitate indirect communication between one or more UEs (e.g., UE 512C and/or 512D) and network nodes (e.g., network node 510B). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a Virtual Reality (VR) headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular if one or more of the UEs are low energy IoT devices.

The hub 514 may have a constant/persistent or intermittent connection to the network node 510B. The hub 514 may also allow for a different communication scheme and/or schedule between the hub 514 and UEs (e.g., UE 512C and/or 512D), and between the hub 514 and the core network 506. In other examples, the hub 514 is connected to the core network 506 and/or one or more UEs via a wired connection. Moreover, the hub 514 may be configured to connect to a Machine-to-Machine (M2M) service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510B. In other embodiments, the hub 514 may be a non-dedicated hub—that is, a device which is capable of operating to route communications between the UEs and the network node 510B, but which is additionally capable of operating as a communication start and/or end point for certain data channels.

Figure 6:
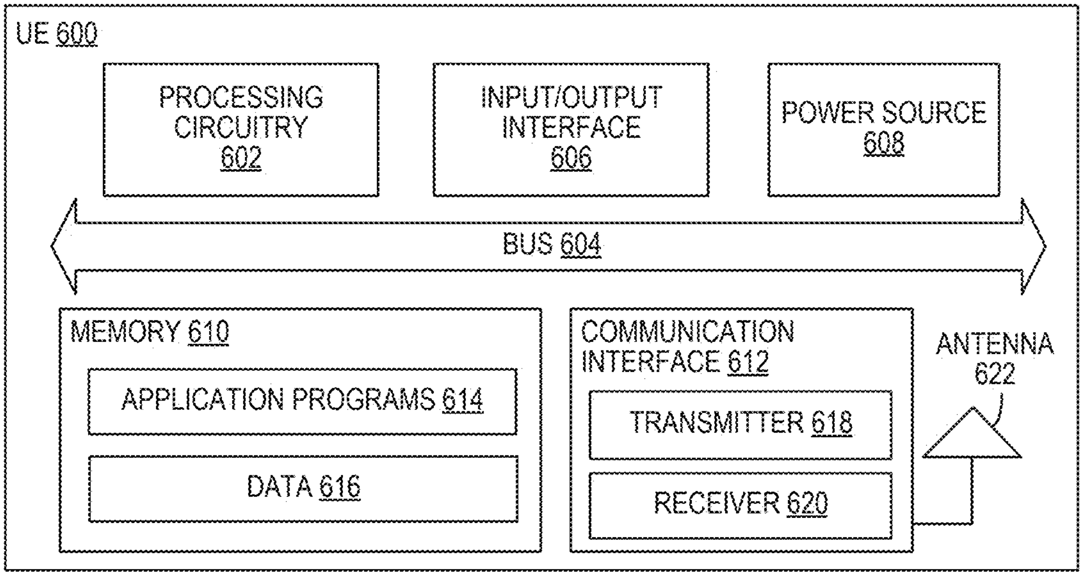
FIG. 6 illustrates a block schematic of an example user equipment, according to some embodiments.

FIG. 6 shows a UE 600 in accordance with some embodiments. As used herein, a UE refers to a device capable, configured, arranged, and/or operable to communicate wirelessly with network nodes and/or other UEs. Examples of a UE include, but are not limited to, a smart phone, mobile phone, cell phone, Voice over Internet Protocol (VOIP) phone, wireless local loop phone, desktop computer, Personal Digital Assistant (PDA), wireless camera, gaming console or device, music storage device, playback appliance, wearable terminal device, wireless endpoint, mobile station, tablet, laptop, Laptop Embedded Equipment (LEE), Laptop Mounted Equipment (LME), smart device, wireless Customer Premise Equipment (CPE), vehicle, vehicle-mounted or vehicle embedded/integrated wireless device, etc. Other examples include any UE identified by the 3GPP, including a Narrowband Internet of Things (NB-IoT) UE, a Machine Type Communication (MTC) UE, and/or an enhanced MTC (eMTC) UE.

A UE may support Device-to-Device (D2D) communication, for example by implementing a 3GPP standard for sidelink communication, Dedicated Short-Range Communication (DSRC), Vehicle-to-Vehicle (V2V), Vehicle-to-Infrastructure (V2I), or Vehicle-to-Everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, Field Programmable Gate Arrays (FPGAs), Application Specific Integrated Circuits (ASICs), etc.); programmable logic together with appropriate firmware; one or more stored computer programs, general purpose processors, such as a microprocessor or Digital Signal Processor (DSP), together with appropriate software; or any combination of the above. For example, the processing circuitry 602 may include multiple Central Processing Units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as Random Access Memory (RAM), Read Only Memory (ROM), Programmable ROM (PROM), Erasable PROM (EPROM), Electrically EPROM (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as Redundant Array of Independent Disks (RAID), flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a tamper resistant module in the form of a Universal Integrated Circuit Card (UICC) including one or more Subscriber Identity Modules (SIMs), such as a Universal SIM (USIM) and/or Internet Protocol Multimedia Services Identity Module (ISIM), other memory, or any combination thereof. The UICC may for example be an embedded UICC (eUICC), integrated UICC (iUICC) or a removable UICC commonly known as a 'SIM card.' The memory 610 may allow the UE 600 to access instructions, application programs, and the like stored on transitory or non-transitory memory media, to off-load data, or to upload data. An article of manufacture, such as one utilizing a communication system, may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., the antenna 622) and may share circuit components, software, or firmware, or alternatively be implemented separately.

In the illustrated embodiment, communication functions of the communication interface 612 may include cellular communication, WiFi communication, LPWAN communication, data communication, voice communication, multimedia communication, short-range communications such as Bluetooth, NFC, location-based communication such as the use of the Global Positioning System (GPS) to determine a location, another like communication function, or any combination thereof. Communications may be implemented according to one or more communication protocols and/or standards, such as IEEE 802.11, Code Division Multiplexing Access (CDMA), Wideband CDMA (WCDMA), GSM, LTE, NR, UMTS, WiMax, Ethernet, Transmission Control Protocol/Internet Protocol (TCP/IP), Synchronous Optical Networking (SONET), Asynchronous Transfer Mode (ATM), Quick User Datagram Protocol Internet Connection (QUIC), Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application, and healthcare. Non-limiting examples of such an IoT device are a device which is or which is embedded in: a connected refrigerator or freezer, a television, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or VR, a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship, an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator and handle communication of data for both the speed sensor and the actuators.

Figure 7:
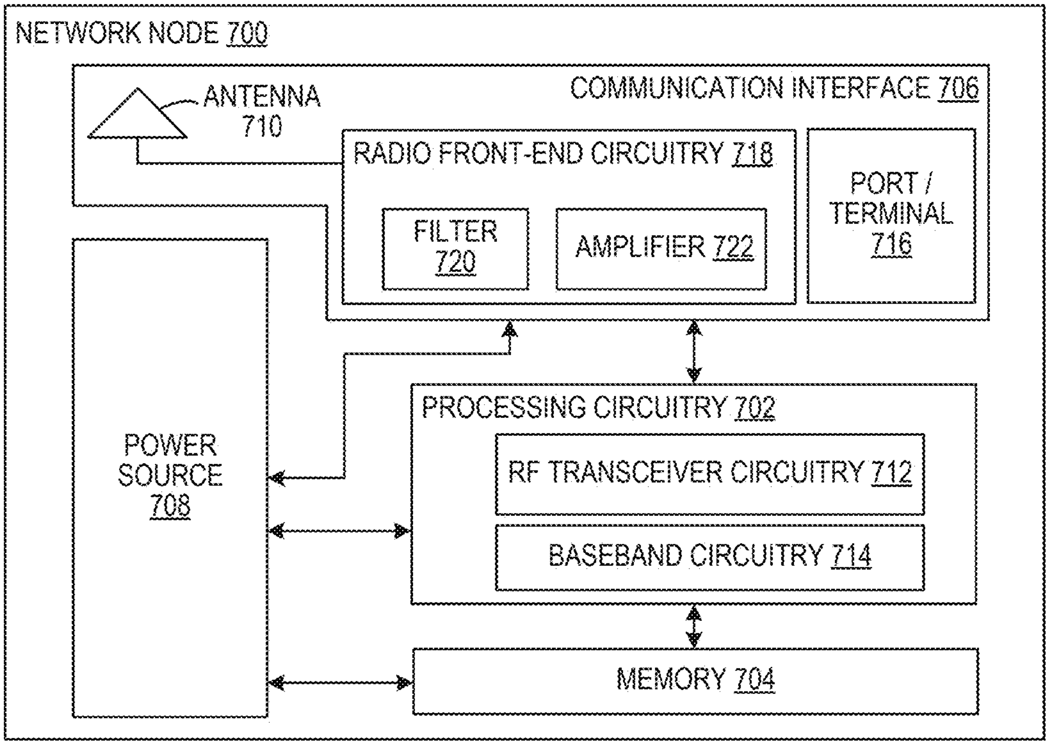
FIG. 7 illustrates a block schematic of an example network node, according to some embodiments.

FIG. 7 shows a network node 700 in accordance with some embodiments. As used herein, network node refers to equipment capable, configured, arranged, and/or operable to communicate directly or indirectly with a UE and/or with other network nodes or equipment in a telecommunication network. Examples of network nodes include, but are not limited to, APs (e.g., radio APs), Base Stations (BSs) (e.g., radio BSs, Node Bs, evolved Node Bs (eNBs), NR Node Bs (gNBs)), and O-RAN nodes or components of an O-RAN node (e.g., O-RU, O-DU, O-CU).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units, distributed units (e.g., in an O-RAN access node), and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS).

Other examples of network nodes include multiple Transmission Point (multi-TRP) 5G access nodes, Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes processing circuitry 702, memory 704, a communication interface 706, and a power source 708. The network node 700 may be composed of multiple physically separate components (e.g., a NodeB component and an RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair may in some instances be considered a single separate network node. In some embodiments, the network node 700 may be configured to support multiple RATs. In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, Long Range Wide Area Network (LoRaWAN), Radio Frequency Identification (RFID), or Bluetooth wireless technologies. These wireless technologies may be integrated into the same or different chip or set of chips and other components within the network node 700.

The processing circuitry 702 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other network node 700 components, such as the memory 704, to provide network node 700 functionality.

In some embodiments, the processing circuitry 702 includes a System on a Chip (SOC). In some embodiments, the processing circuitry 702 includes one or more of Radio Frequency (RF) transceiver circuitry 712 and baseband processing circuitry 714. In some embodiments, the RF transceiver circuitry 712 and the baseband processing circuitry 714 may be on separate chips (or sets of chips), boards, or units, such as radio units and digital units. In alternative embodiments, part or all of the RF transceiver circuitry 712 and the baseband processing circuitry 714 may be on the same chip or set of chips, boards, or units.

The memory 704 may comprise any form of volatile or non-volatile computer-readable memory including, without limitation, persistent storage, solid state memory, remotely mounted memory, magnetic media, optical media, RAM, ROM, mass storage media (for example, a hard disk), removable storage media (for example, a flash drive, a Compact Disk (CD), or a Digital Video Disk (DVD)), and/or any other volatile or non-volatile, non-transitory device-readable, and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and the memory 704 are integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. The radio front-end circuitry 718 comprises filters 720 and amplifiers 722. The radio front-end circuitry 718 may be connected to the antenna 710 and the processing circuitry 702. The radio front-end circuitry 718 may be configured to condition signals communicated between the antenna 710 and the processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of the filters 720 and/or the amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface 706 may comprise different components and/or different combinations of components.

In certain alternative embodiments, the network node 700 does not include separate radio front-end circuitry 718; instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes the one or more ports or terminals 716, the radio front-end circuitry 718, and the RF transceiver circuitry 712 as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, the communication interface 706, and/or the processing circuitry 702 may be configured to perform any receiving operations and/or certain obtaining operations described herein as being performed by the network node 700. Any information, data, and/or signals may be received from a UE, another network node, and/or any other network equipment. Similarly, the antenna 710, the communication interface 706, and/or the processing circuitry 702 may be configured to perform any transmitting operations described herein as being performed by the network node 700. Any information, data, and/or signals may be transmitted to a UE, another network node, and/or any other network equipment.

The power source 708 provides power to the various components of the network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid or an electricity outlet) via input circuitry or an interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700. In some embodiments providing a core network node, such as core network node 108 of FIG. 5, some components, such as the radio front-end circuitry 718 and the RF transceiver circuitry 712 may be omitted.

Figure 8:
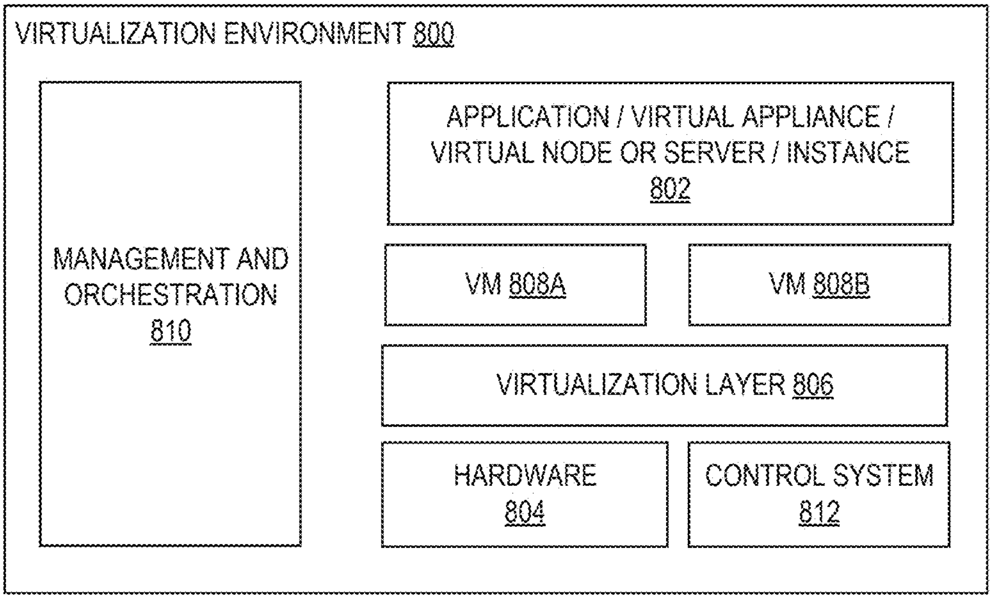
FIG. 8 is a block diagram illustrating a virtualization environment in which functions implemented by some embodiments may be virtualized, according to some embodiments.

FIG. 8 is a block diagram illustrating a virtualization environment 800 in which functions implemented by some embodiments may be virtualized. In the present context, virtualizing means creating virtual versions of apparatuses or devices which may include virtualizing hardware platforms, storage devices, and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more Virtual Machines (VMs) implemented in one or more virtualization environments 800 hosted by one or more of hardware nodes, such as a hardware computing device that operates as a network node, a UE, a core network node, or a host. Further, in embodiments in which the virtual node does not require radio connectivity (e.g., a core network node or host), then the node may be entirely virtualized. In some embodiments, the virtualization environment 800 includes components defined by the O-RAN Alliance, such as an O-Cloud environment orchestrated by a Service Management and Orchestration Framework via an O-2 interface. Virtualization may facilitate distributed implementations of a network node, a UE, a core network node, or a host.

Applications 802 (which may alternatively be called software instances, virtual appliances, network functions, virtual nodes, virtual network functions, etc.) are run in the virtualization environment 800 to implement some of the features, functions, and/or benefits of some of the embodiments disclosed herein.

Hardware 804 includes processing circuitry, memory that stores software and/or instructions executable by hardware processing circuitry, and/or other hardware devices as described herein, such as a network interface, an input/output interface, and so forth. Software may be executed by the processing circuitry to instantiate one or more virtualization layers 806 (also referred to as hypervisors or Virtual Machine Monitors (VMMs)), provide VMs 808A and 808B (one or more of which may be generally referred to as VMs 808), and/or perform any of the functions, features, and/or benefits described in relation with some embodiments described herein. The virtualization layer 806 may present a virtual operating platform that appears like networking hardware to the VMs 808.

The VMs 808 comprise virtual processing, virtual memory, virtual networking, or interface and virtual storage, and may be run by a corresponding virtualization layer 806. Different embodiments of the instance of a virtual appliance 802 may be implemented on one or more of VMs 808, and the implementations may be made in different ways. Virtualization of the hardware is in some contexts referred to as Network Function Virtualization (NFV). NFV may be used to consolidate many network equipment types onto industry standard high volume server hardware, physical switches, and physical storage, which can be located in data centers and customer premise equipment.

In the context of NFV, a VM 808 may be a software implementation of a physical machine that runs programs as if they were executing on a physical, non-virtualized machine. Each of the VMs 808, and that part of the hardware 804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 808 on top of the hardware 804 and corresponds to the application 802.

The hardware 804 may be implemented in a standalone network node with generic or specific components. The hardware 804 may implement some functions via virtualization. Alternatively, the hardware 804 may be part of a larger cluster of hardware (e.g., such as in a data center or CPE) where many hardware nodes work together and are managed via management and orchestration 810, which, among others, oversees lifecycle management of the applications 802. In some embodiments, the hardware 804 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 812 which may alternatively be used for communication between hardware nodes and radio units.

Although the computing devices described herein (e.g., UEs, network nodes) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining, or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Those skilled in the art will recognize improvements and modifications to the embodiments of the present disclosure. All such improvements and modifications are considered within the scope of the concepts disclosed herein.

EMBODIMENTS

Group A Embodiments

1. A method performed by a User Equipment, UE, the method comprising:
   - performing (406) a Random Access Channel, RACH-less Layer 1/Layer 2 Triggered Mobility, LTM, execution procedure to an LTM candidate cell when the LTM candidate cell is also a current serving cell with which the UE is configured.

2. The method of embodiment 1, wherein the current serving cell is configured at the UE before the LTM execution.

3. The method of embodiment 1 or 2, wherein performing (406) the RACH-less LTM execution to the LTM candidate cell comprises performing (406) the RACH-less LTM execution to the LTM candidate cell in response to reception of an LTM cell switch command.

4. The method of embodiment 3, further comprising receiving (400) the LTM cell switch command, prior to performing (406) the RACH-less LTM execution procedure to the LTM candidate cell.

5. The method of embodiment 4, wherein the LTM cell switch command is received from a Serving Distributed Unit, S-DU, associated to a Master Cell Group, MCG, or a Secondary Cell Group, SCG, of the UE.

6. The method of any of embodiments 3 to 5, wherein the LTM cell switch command comprises an indication that no valid timing adjustment and/or timing advance is available for the LTM candidate cell indicated in the LTM cell switch command 7. The method of any of embodiments 3 to 6, wherein performing (406) the RACH-less LTM execution is triggered by reception of the LTM cell switch command and for the case when the UE is not configured to estimate the TA on its own.

8. The method of embodiment 1 or 2, wherein performing (406) the RACH-less LTM execution to the LTM candidate cell comprises performing (406) the RACH-less LTM execution to the LTM candidate cell in response to fulfillment of a Conditional LTM, CLTM, execution condition.

9. The method of embodiment 8, further comprising determining (402) that the CLTM execution condition is fulfilled, prior to performing (406) the RACH-less LTM execution procedure to the LTM candidate cell.

10. The method of embodiment 8 or 9, wherein the CLTM execution condition is associated to the LTM candidate cell.

11. The method of any of embodiments 8 to 10, wherein performing (406) the RACH-less LTM execution is triggered in response to fulfillment of the CLTM execution condition and for the case when the UE is not configured to estimate the TA on its own.

12. The method of any of embodiments 8 to 11, wherein the CLTM execution condition comprises any one or more of the following:
   - LTM candidate cell becomes an offset better than a current Special cell (SpCell), e.g. Primary cell (PCell) or Primary Secondary cell (PSCell);
   - beam with highest measurement quantity of an LTM candidate cell becomes an offset better than a beam with highest measurement quantity of the current SpCell, wherein the measurement quantity comprises, e.g., an RSRP, RSRQ or SINR;
   - Synchronization Signal Block (SSB) with highest measurement quantity of an LTM candidate cell becomes an offset better than a SSB with highest measurement quantity of the current SpCell, wherein the measurement quantity comprises, e.g., an RSRP, RSRQ or SINR;
   - a lower layer measurement of an LTM candidate cell becomes an offset better than a lower layer measurement of the current SpCell.

13. The method of any of embodiments 1 to 12, wherein the LTM candidate cell, which is also a current serving cell, corresponds to any one or more of the following:
   - the LTM candidate cell, which is also a current serving cell, is a Secondary Cell, SCell, of a same cell group in which the LTM execution procedure is being triggered;
   - the LTM candidate cell, which is also a current serving cell, is a SCell of different cell group from that in which the LTM execution procedure is being triggered;
   - the LTM candidate cell, which is also a current serving cell, is a Special Cell, SpCell, of different cell group from that in which the LTM execution procedure is being triggered.

14. The method of any of embodiments 1 to 13, wherein performing (406) the RACH-less LTM execution procedure to the LTM candidate cell comprises performing (406) the RACH-less LTM execution procedure to the LTM candidate cell when the LTM candidate cell is also a current serving cell with which the UE is configured and uplink synchronization to the serving cell is valid.

15. The method of embodiment 14, wherein uplink synchronization to the serving cell (i.e., a TA value of the serving cell) is valid when a time alignment timer, associated to the serving cell, is still running.

16. The method of any of embodiments 1 to 13, wherein performing (406) the RACH-less LTM execution procedure to the LTM candidate cell comprises performing (406) the RACH-less LTM execution procedure to the LTM candidate cell when:
   - the LTM candidate cell is also a current serving cell with which the UE is configured; and either or both:
     - uplink synchronization to the serving cell is valid;
     - the UE has obtained, for the serving cell, information on how to perform UL sync which was not part of the LTM configuration.

17. The method of any of embodiments 1 to 16, wherein performing (406) the RACH-less LTM execution procedure to the LTM candidate cell comprises any one or more of the following:
   - sending (406A) a Scheduling Request, SR, over Physical Uplink Control Channel, PUCCH, on the LTM candidate cell;
   - sending uplink information (e.g., payload associated to an RRC Reconfiguration Complete message) using a pre-configured uplink grant on the LTM candidate cell;
   - selecting a beam (and/or a reference signal) of the LTM candidate cell;

applying a LTM candidate cell configuration associated to the LTM candidate cell.

Group B Embodiments

18. A user equipment, comprising:

processing circuitry configured to perform any of the steps of any of the Group A embodiments; and power supply circuitry configured to supply power to the processing circuitry.

19. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

What is claimed is:

1. A method performed by a User Equipment, UE, the method comprising:

performing a Random Access Channel (RACH)-less Layer 1/Layer 2 Triggered Mobility (LTM) execution procedure to an LTM candidate cell that is a current serving cell included in a Master Cell Group (MCG) or Secondary Cell Group (SCG) with which the UE is configured, wherein performing the RACH-less LTM execution procedure comprises sending a Scheduling Request (SR) over Physical Uplink Control Channel (PUCCH) on the LTM candidate cell.

2. The method of claim 1, wherein the current serving cell is configured at the UE before the LTM execution.

3. The method of claim 1, wherein performing the RACH-less LTM execution procedure to the LTM candidate cell is in response to reception of an LTM cell switch command.

4. The method of claim 3, further comprising receiving the LTM cell switch command, prior to performing the RACH-less LTM execution procedure to the LTM candidate cell.

5. The method of claim 4, wherein the LTM cell switch command is received from a Serving Distributed Unit (S-DU) that is associated to one of a Master Cell Group (MCG) or a Secondary Cell Group (SCG) of the UE.

6. The method of claim 3, wherein the LTM cell switch command comprises an indication that at least no valid timing adjustment or no timing advance is available for the LTM candidate cell indicated in the LTM cell switch command.

7. The method of claim 3, wherein performing the RACH-less LTM execution procedure is triggered by reception of the LTM cell switch command and for the case when the UE is not configured to estimate a timing advance (TA) on its own.

8. The method of claim 1, wherein performing the RACH-less LTM execution procedure to the LTM candidate cell is in response to fulfillment of a Conditional LTM (CLTM) execution condition.

9. The method of claim 8, further comprising determining that the CLTM execution condition is fulfilled, prior to performing the RACH-less LTM execution procedure to the LTM candidate cell.

10. The method of claim 8, wherein the CLTM execution condition is associated to the LTM candidate cell.

11. The method of claim 8, wherein performing the RACH-less LTM execution is triggered in response to fulfillment of the CLTM execution condition and for the case when the UE is not configured to estimate a timing advance (TA) on its own.

12. The method of claim 8, wherein the CLTM execution condition comprises any one or more of the following:

the LTM candidate cell becomes an offset better than a current Special cell (SpCell);

a beam with highest measurement quantity of the LTM candidate cell becomes an offset better than a beam with highest measurement quantity of the current SpCell, wherein the measurement quantity comprises any one of: a Reference Signal Received Power (RSRP), a Reference Signal Received Quality (RSRQ), or a Signal-to-Interference and Noise Ratio (SINR);

a Synchronization Signal Block (SSB) with highest measurement quantity of the LTM candidate cell becomes an offset better than an SSB with highest measurement quantity of the current SpCell, wherein the measurement quantity comprises any one of an RSRP, an RSRQ or an SINR; or a lower layer measurement of the LTM candidate cell becomes an offset better than a lower layer measurement of the current SpCell.

13. The method of claim 1, wherein the LTM candidate cell is at least one of:

a Secondary Cell (SCell) of a same cell group in which the LTM execution procedure is being triggered;

a SCell of a different cell group from that in which the LTM execution procedure is being triggered; or a Special Cell (SpCell) of a different cell group from that in which the LTM execution procedure is being triggered.

14. The method of claim 1, wherein the RACH-less LTM execution procedure to the LTM candidate cell is performed when the LTM candidate cell is also a current serving cell with which the UE is configured and when uplink synchronization to the serving cell is valid.

15. The method of claim 14, wherein uplink synchronization to the serving cell is valid when a time alignment timer, associated to the serving cell, is still running.

16. The method of claim 1, the RACH-less LTM execution procedure to the LTM candidate cell is performed when:

the LTM candidate cell is also a current serving cell with which the UE is configured; and when at least one of:

uplink synchronization to the serving cell is valid; or the UE has obtained, for the serving cell, information on how to perform UL sync which was not part of the LTM configuration.

17. The method of claim 1, wherein performing the RACH-less LTM execution procedure to the LTM candidate cell comprises any one or more of the following:

sending uplink information using a pre-configured uplink grant on the LTM candidate cell;

selecting a beam of the LTM candidate cell;

applying an LTM candidate cell configuration associated to the LTM candidate cell.

18. The method of claim 1, wherein a source cell and a target cell have same Timing Advance Group (TAG).

19. A user equipment, UE, comprising:

an antenna configured to send and receive wireless signals;

radio front-end circuitry connected to the antenna and to processing circuitry, and configured to condition signals communicated between the antenna and the processing circuitry;

the processing circuitry being configured to perform a Random Access Channel (RACH)-less Layer 1/Layer 2 Triggered Mobility (LTM) execution procedure to an LTM candidate cell that is a current serving cell included in a Master Cell Group (MCG) or Secondary Cell Group (SCG) with which the UE is configured, wherein performing of the RACH-less LTM execution procedure comprises sending a Scheduling Request (SR) over a Physical Uplink Control Channel (PUCCH) on the LTM candidate cell.

20. A non-transitory computer-readable medium storing instructions which, when executed by processing circuitry of a user equipment (UE), causes the UE to perform a Random Access Channel (RACH)-less Layer 1/Layer 2 Triggered Mobility (LTM) execution procedure to an LTM candidate cell when the LTM candidate cell that is also a current serving cell included in a Master Cell Group (MCG) or Secondary Cell Group (SCG) with which the UE is configured, wherein performing the RACH-less LTM execution procedure comprises sending a Scheduling Request (SR) over Physical Uplink Control Channel (PUCCH) on the LTM candidate cell.

21. A radio access network node configured to communicate directly or indirectly with a UE, the radio access network node comprising:

an antenna configured to send and receive wireless signals; and radio front-end circuitry connected to the antenna and to processing circuitry, and configured to condition signals communicated between the antenna and the processing circuitry, the processing circuitry being configured to perform a Random Access Channel (RACH)-less Layer 1/Layer 2 Triggered Mobility (LTM) execution procedure with a user equipment (UE), wherein the network node is an LTM candidate cell of the UE that is also a current serving cell included in a Master Cell Group (MCG) or Secondary Cell Group (SCG) with which the UE is configured, and wherein the performing of the RACH-less LTM execution procedure comprises receiving a Scheduling Request (SR) over a Physical Uplink Control Channel (PUCCH) of the network node.

* * * * *